US009564261B2

(12) United States Patent
Kwon et al.

(10) Patent No.: US 9,564,261 B2
(45) Date of Patent: Feb. 7, 2017

(54) METHOD FOR ANALYZING COLOR CODE ENCODED IN MAGNETIC STRUCTURE

(75) Inventors: Sunghoon Kwon, Seoul (KR); Howon Lee, Seoul (KR); Junhoi Kim, Seoul (KR); Hyoki Kim, Seoul (KR)

(73) Assignee: SNU R&DB FOUNDATION, Seoul (KR)

( * ) Notice: Subject to any disclaimer, the term of this patent is extended or adjusted under 35 U.S.C. 154(b) by 599 days.

(21) Appl. No.: 13/271,656

(22) Filed: Oct. 12, 2011

(65) Prior Publication Data

US 2012/0028834 A1 Feb. 2, 2012

Related U.S. Application Data

(63) Continuation-in-part of application No. PCT/KR2010/002249, filed on Apr. 13, 2010.

(60) Provisional application No. 61/169,260, filed on Apr. 14, 2009.

(30) Foreign Application Priority Data

Mar. 31, 2010 (KR) .................. 10-2010-0029613

(51) Int. Cl.
- *C40B 30/04* (2006.01)
- *H01F 1/00* (2006.01)
- *B82Y 25/00* (2011.01)
- *H01F 1/28* (2006.01)

(52) U.S. Cl.
CPC ............ *H01F 1/0063* (2013.01); *B82Y 25/00* (2013.01); *H01F 1/0054* (2013.01); *B22F 2999/00* (2013.01); *H01F 1/28* (2013.01)

(58) Field of Classification Search
USPC .......................................... 506/34
See application file for complete search history.

(56) References Cited

U.S. PATENT DOCUMENTS

2003/0129654 A1* 7/2003 Ravkin ............ G01N 33/54313
435/7.1
2009/0278954 A1* 11/2009 Kanamori .............. H04N 9/045
348/222.1

(Continued)

FOREIGN PATENT DOCUMENTS

| KR | 10-2004-0081103 A | 9/2004 |
|---|---|---|
| KR | 10-2004-0086256 A | 10/2004 |
| WO | WO 2009/017525 | 2/2009 |

OTHER PUBLICATIONS

Pregibon et al. (Science, 2007, vol. 315, pp. 1393-1396, "Multifunctional encoded particles for high-throughput biomolecule analysis").*

(Continued)

*Primary Examiner* — Betty Forman
(74) *Attorney, Agent, or Firm* — STIP Law Group, LLC

(57) ABSTRACT

Provided is a color encoding method including providing a composition including a liquid medium and magnetic nanoparticles dispersed in the liquid medium; applying a magnetic field to the composition to align the magnetic nanoparticles; and applying a patterned energy source to the composition to solidify the composition, wherein more than one region of the composition are sequentially solidified with varying magnetic field strength to fix a plurality of color codes.

7 Claims, 8 Drawing Sheets
(5 of 8 Drawing Sheet(s) Filed in Color)

(56) References Cited

U.S. PATENT DOCUMENTS

| | | | | |
|---|---|---|---|---|
| 2010/0224823 | A1* | 9/2010 | Yin | B82Y 30/00 252/62.56 |
| 2010/0330693 | A1* | 12/2010 | Chapin | B01L 3/502761 436/172 |
| 2011/0180745 | A1* | 7/2011 | Margutti et al. | 252/62.51 R |
| 2012/0190056 | A1* | 7/2012 | Santalo Pedro et al. | 435/29 |

OTHER PUBLICATIONS

Ge et al Magnetochromatic microspheres: rotating photonic crystals, J. Am Chem. Soc, Jun. 15, 2009, 131: 15687-15694.*

Korean Intellectual Property Office, International Search Report for International Application No. PCT/KR2010/002249, Dec. 13, 2010.

Jianping Ge et al., "Magnetically Tunable Colloidal Photonic Structures in Alkanol Solutions", Advanced Materials, 2008, pp. 3485-3491, vol. 20.

Jianping Ge et al., "Highly Tunable Superparamagnetic Colloidal Photonic Crystals", Angewandte Chemic International Edition, 2007, pp. 7428-7431, vol. 46.

Jianping Ge et al., "Superparamagnetic Composite Colloids with Anisotropic Structures", Journal of the American Chemical Society, 2007, pp. 8974-8975, vol. 129.

Xiangling Xu et al., "Mesoscopic Monodisperse Ferromagnetic Colloids Enable Magnetically . . . ", Journal of the American Chemical Society, 2002, pp. 13864-13868, vol. 124.

Jun Hyuk Moon et al., "Colloidal Engineering for Nano-Bio Fusion Research", Korean Chem. Eng. Res., Aug. 2008, pp. 647-659, vol. 46, No, 4.

Chih-Kai Huang et al., "Magnetic SiO2/Fe3O4 colloidal crystals", Nanotechnology 19, 2008, 055701 (5pp), IOP Publishing Ltd.

Xiangling Xu et al., "Superparamagnetic Photonic Crystals", Advanced Materials, Nov. 16, 2001, pp. 1681-1684, vol. 13, No. 22.

Vinayak Rastogi et al., "Synthesis of Light-Diffracting Assemblies from Microspheres and Nanoparticles in Droplets on . . . ", Advanced Materials, 2008, pp. 4263-4268, vol. 20.

Orlin D. Velev et al., "A Class of Microstructured Particles Through Colloidal Crystallization", Science, Mar. 24, 2000, pp. 2240-2243, vol. 287.

Byron Gates et al., "Photonic Crystals That Can Be Addressed with an External Magnetic Field", Advanced Materials, Nov. 2, 2001, pp. 1605-1608, vol. 13, No. 21.

Benjamin T. A. Chang et al., "CARIVERSE Resin: A Thermally Reversible Network Polymer for Electronic . . . ", Electronic Components and Technology Conference, 1999, pp. 49-55.

Gira Yi, Photonic Crystals for Controlling the Light, Nice, 2005, pp. 446-455, vol. 23, No. 4.

* cited by examiner

Fig. 10

| Position | (R,G,B) Level | Code Level |
|---|---|---|
| 0 | (50, 114, 60) | (1,2,3) |
| 1 | (180, 124, 38) | (3,2,2) |
| 2 | (210, 236, 8) | (4,4,1) |
| 3 | (134, 142, 41) | (3,3,2) |
| 4 | (209, 235, 8) | (4,4,1) |
| 5 | (173, 121, 36) | (3,2,2) |
| 6 | (206, 235, 7) | (4,4,1) |
| 7 | (147, 153, 45) | (3,3,2) |
| 8 | (145, 152, 46) | (3,3,2) |
| 9 | (172, 119, 34) | (3,2,2) |

METHOD FOR ANALYZING COLOR CODE ENCODED IN MAGNETIC STRUCTURE

CROSS REFERENCE TO PRIOR APPLICATIONS

This application claims the benefit under 35 U.S.C. §120 and §365(c) to a prior PCT International Patent Application No. PCT/KR2010/002249 (filed on Apr. 13, 2010 and designating the U.S.), which claims priority to U.S. Provisional Application No. 61/169,260 (filed on Apr. 14, 2009) and Korean Patent Application No. 10-2010-0029613 (filed on Mar. 31, 2010), which are all hereby incorporated by reference in their entirety.

TECHNICAL FIELD

The described technology generally relates to a color encoded magnetic structure.

BACKGROUND

Multiplex analysis based on encoded particles has attracted great attention in high throughput biomolecule screening such as drug discovery and clinical diagnostics due to its expandability and fast reactivity. The multiplex analysis may be accomplished by mixing many encoded probe particles together in the same space containing target analytes.

In various samples, it is necessary to use a large number of distinct codes to increase throughput. To ensure a sufficiently large number of codes for microparticles, a spectral encoding method using coloring materials such as quantum dots or fluorescent dyes, which are embedded inside or attached on the surface of the microparticle and a graphical encoding method based on patterning of an optically detectable elements on the surface of the microparticle have been suggested.

SUMMARY

In one embodiment, a color encoding method is provided. The method includes: providing a composition including a liquid medium and magnetic nanoparticles dispersed in the liquid medium; applying a magnetic field to the composition to align the magnetic nanoparticles; and applying a patterned energy source to the composition to solidify the composition, wherein more than one region of the composition are sequentially solidified with varying magnetic field strength to fix a plurality of color codes.

In another embodiment, a method of manufacturing a color encoded magnetic structure is provided. The method includes: filling a microfluidic channel with a composition including a curable material and magnetic nanoparticles dispersed in the curable material; applying a magnetic field to the composition in the microfluidic channel to form one-dimensional (1D) chain structures of the magnetic nanoparticles; and applying patterned UV rays to the composition to form a free-floating particle with fixed 1D chain structures.

In yet another embodiment, a color encoded magnetic structure is provided. The color encoded magnetic structure includes: a solid medium; and a code region present in the solid medium and including magnetic nanoparticles aligned in a chain structure. The color encoded magnetic structure is encoded in multilevel by generating structural colors determined by inter-particle distance between the aligned magnetic nanoparticles.

In still another embodiment, a method of analyzing a color code is provided. The method includes: providing a magnetic structure including a probe region and a code region encoded with a color code; binding a target with the probe region; and decoding information from the magnetic structure with the target, wherein the code region includes a photonic crystal of magnetic nanoparticles.

The Summary is provided to introduce a selection of concepts in a simplified form that are further described below in the Detailed Description. The Summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and advantages of the present disclosure will become more apparent to those of ordinary skill in the art by describing in detail exemplary embodiments thereof with reference to the attached drawings in which:

FIG. 10 shows results obtained after the encoded particle of FIG. 9 is decoded.

DETAILED DESCRIPTION

Figure 1:
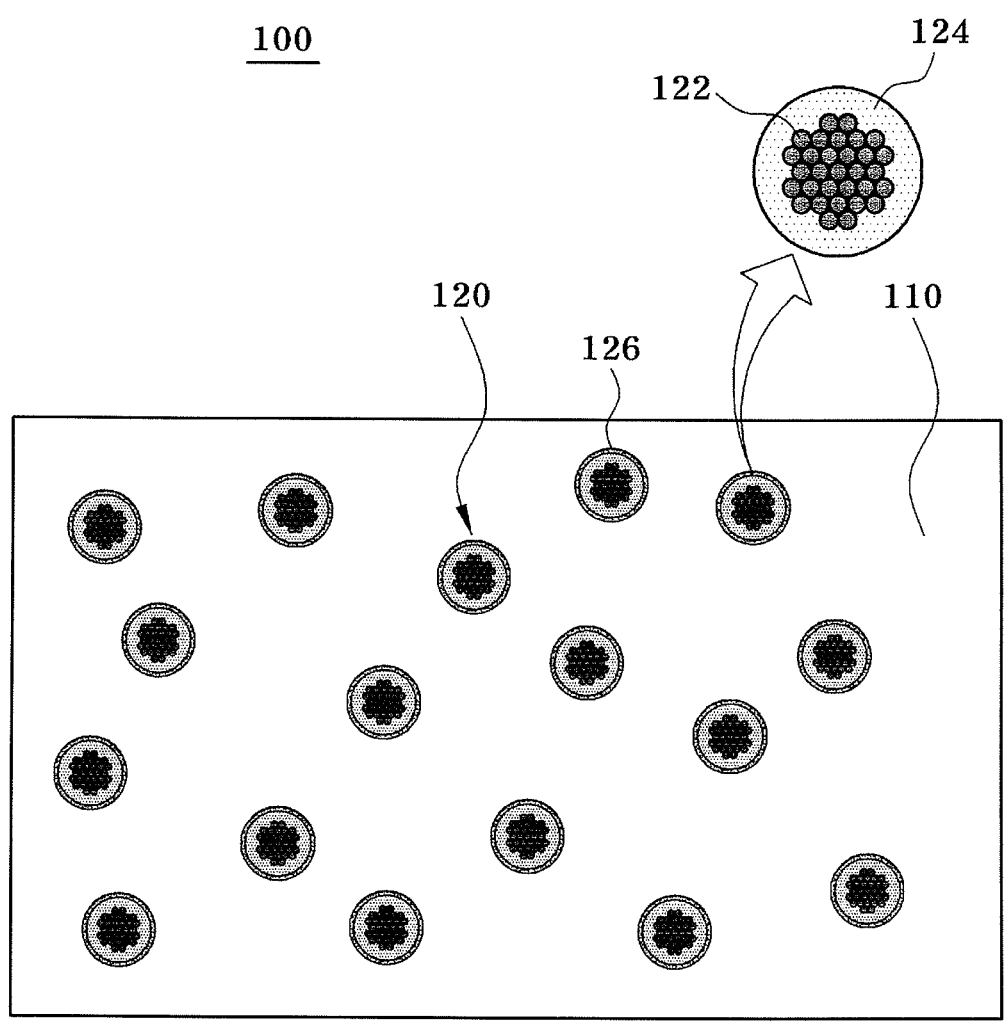
FIG. 1 is a diagram showing an exemplary embodiment of a composition for color encoding.

It will be readily understood that the components of the present disclosure, as generally described and illustrated in the Figures herein, could be arranged and designed in a wide variety of different configurations. Thus, the following more detailed description of the embodiments of apparatus and methods in accordance with the present disclosure, as represented in the Figures, is not intended to limit the scope of the disclosure, as claimed, but is merely representative of certain examples of embodiments in accordance with the disclosure. The presently described embodiments will be best understood by reference to the drawings, wherein like parts are designated by like numerals throughout. Moreover, the drawings are not necessarily to scale, and the size and relative sizes of the layers and regions may have been exaggerated for clarity.

As used in the description herein and throughout the claims, the following terms take the meanings explicitly associated herein, unless the context clearly dictates otherwise: the meaning of "a", "an", and "the" includes plural reference, the meaning of "in" includes "in" and "on". It will also be understood that when an element or layer is referred to as being "on" another element or layer, the element or layer may be directly on the other element or layer or intervening elements or layers may be present. As used herein, the term "and/or" may include any and all combinations of one or more of the associated listed items.

According to one exemplary embodiment, color encoding may be performed by the following method: First, a composition including a liquid medium and magnetic nanoparticles dispersed in the liquid medium is prepared. The liquid medium may be a photocurable material. In addition, the magnetic nanoparticles may include superparamagnetic materials. The magnetic nanoparticle may be coated with a shell layer to improve dispersibility and solvation repulsion.

Subsequently, the magnetic nanoparticles are aligned by applying a magnetic field to the composition. Concurrently, the composition is solidified by irradiating a patterned energy source. Here, a color encoded structure may be prepared by fixing a plurality of color codes by sequentially solidifying different regions of the composition with varying the magnetic field strength. The patterned energy source suitable for the solidification may include heat, UV rays, visible rays, infrared rays, an electron beam, etc. without limitation. The 1D chain structure may be made by the alignment of the magnetic nanoparticles, and structural colors may be determined by inter-particle distance between the magnetic nanoparticles forming the chain structures. With an increase in the magnetic field strength, a structural color of a shorter wavelength region may be produced. The composition may further include a hydrogen bonding solvent to form a solvation layer around the magnetic nanoparticles.

For example, the irradiation of the patterned UV rays may be performed using a physical mask or digital micromirror device (DMD). As a patterning method, a technique such as optofluidic maskless lithography (OFML) may be used to prevent diffusion of free radicals and produce a high-definition microscale pattern during polymerization.

The plurality of color codes may include information such as a shape, a position and a color independently or in combination. For example, the plurality of color codes may be discriminated each other by their specific colors at different positions. The plurality of color codes may be in the form of dots, lines or any other shapes. Since a photonic crystal structure formed by the magnetic nanoparticles is maintained by the solidification, a structural color from each color code may not be changed and thus may be fixed.

FIG. 1 is a diagram showing an exemplary embodiment of a composition for color encoding. Referring to FIG. 1, the composition 100 for color encoding may include a curable material 110 and magnetic nanoparticles 120 dispersed in the curable material 110.

The magnetic nanoparticles 120 may include a cluster 122 of magnetic nanocrystals. The size of the magnetic nanoparticles 120 may be several tens to hundreds of nanometers, and the size of the magnetic nanocrystals may be several to several tens of nanometers. Examples of the magnetic nanocrystals may include a magnetic materials or a magnetic alloys. The magnetic material or magnetic alloy may include at least one selected from the group consisting of Co, $Fe_2O_3$, $Fe_3O_4$, $CoFe_2O_4$, MnO, $MnFe_2O_4$, CoCu, CoPt, FePt, CoSm, NiFe and NiFeCo.

The magnetic nanoparticles 120 may be superparamagnetic nanoparticles including a superparamagnetic material. The superparamagnetic material has magnetism only in the presence of an external magnetic field, unlike a ferromagnetic material in which magnetism can be maintained without a magnetic field. Usually, when the particle size of a ferromagnetic material is several to several hundreds of nanometers, the ferromagnetic material may be phase-changed into a superparamagnetic material. For example, when iron oxide is in the size of approximately 10 nm, it may have superparamagnetism.

In addition, the magnetic nanoparticles 120 may be, as shown in FIG. 1, coated with a shell layer 124 surrounding a core formed in the cluster 122 of magnetic nanocrystals. The shell layer 124 allows the magnetic nanoparticles 120 to be evenly distributed in the curable material 110. Furthermore, to be described later, the shell layer 124 may stimulate solvation repulsion on a surface of each magnetic nanoparticle 120 to offset potent magnetic attraction between the magnetic nanoparticles 120. For example, the shell layer 124 may include silica. When the shell layer 124 is surface-modified with silica, a known sol-gel process may be used.

In addition, the composition 100 for color encoding may further include a hydrogen bonding solvent. As the hydrogen bonding solvent, various alkanol solvents such as ethanol, isopropyl alcohol and ethylene glycol may be used. Also, a solvation layer 126 surrounding the magnetic nanoparticle 120 may be formed. For example, as the solvation layer 126 is formed due to an influence of a silanol (Si—OH) functional group on a surface of the shell layer 124 having silica, a repulsion force between the magnetic nanoparticles 120 may be induced. According to one exemplary embodiment, the shell layer 124 and/or the solvation layer 126 may not be present on the magnetic nanoparticles 120. In this case, an electrostatic force on the surface of the magnetic nanoparticles 120 may act as a repulsion force.

As the magnetic nanoparticles 120 are mixed with the curable material 110 and subjected to mechanical stirring or ultrasonic treatment, the composition for color encoding 100 may be prepared. The magnetic nanoparticles 120 may be included in the curable material 110 at a volume fraction of, for example, 0.01% to 20%. When the volume fraction of the magnetic nanoparticles 120 is less than 0.01%, reflectivity may be decreased, and when the volume fraction of the magnetic nanoparticles 120 is more than 20%, reflectivity may not be increased any more.

The curable material 110 may serve as a dispersion medium stably dispersing the magnetic nanoparticles 120 forming a photonic crystal. In addition, as the inter-particle distance between the magnetic nanoparticles 120 is fixed by crosslinking of the curable material 110, a certain structural color may be continuously maintained after a magnetic field is eliminated.

The curable material 110 may include a liquid-phase material such as a monomer, an oligomer or a polymer having a crosslinkable site for curing reaction. The curable material 110 may include a liquid-phase hydrophilic polymer capable of forming a hydrogel. A hydrophilic polymer is a polymer suitable for dispersing the magnetic nanoparticles 120 due to its hydrophilic groups. When the hydrophilic polymer is crosslinked by an appropriate energy source, thereby forming a hydrogel having a three-dimensional network structure, the magnetic nanoparticles 120 may be fixed.

Examples of the curable material 110 capable of forming a hydrogel may include a silicon-containing polymer, polyacrylamide, polyethylene oxide, polyethylene glycol diacrylate, polypropylene glycol diacrylate, polyvinylpyrrolidone, polyvinyl alcohol, polyacrylate or a copolymer thereof. For example, since the curable material 110, polyethylene glycol diacrylate (PEG-DA), has an acrylate functional group at both terminal ends of polyethylene glycol (PEG), the curable material 110 may be crosslinked into a three-dimensional hydrogel via free radical polymerization. The curable material 110 may further include any type of medium which can be changed into a solid from a liquid.

The curable material 110 may further include an initiator, and the initiator may induce free radical polymerization by an external energy source. The initiator may be an azo-based compound or a peroxide. The curable material 110 may further include a proper crosslinking agent, for example, N,N'-methylenebisacrylamide, methylenebismethacrylamide, ethylene glycol dimethacrylate, etc. The magnetic nanoparticles 120 may be aligned in the curable material 110 to generate structural colors under an external magnetic field.

Figure 2:
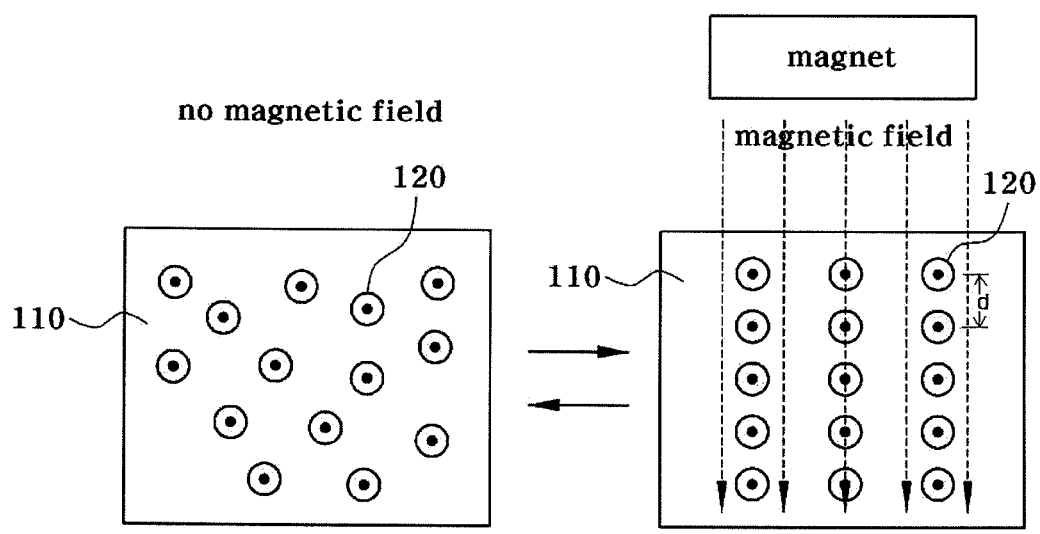
FIG. 2 is a diagram for explaining a principle of generating a structural color using a composition for color encoding.

FIG. 2 is a diagram for explaining a principle of generating a structural color using a composition for color encoding. Referring to FIG. 2, when a magnetic field is not applied, the magnetic nanoparticles 120 are randomly dispersed in the curable material 110, but when a magnetic field is applied from a nearby magnet, the magnetic nanoparticles 120 may be aligned parallel to a direction of the magnetic field to form a photonic crystal, thereby emitting a structural color. The magnetic nanoparticles 120 aligned by the magnetic field may return to the non-aligned state when the magnetic field is eliminated. A photonic crystal is a material having a crystal structure capable of controlling light. Photons (behaving as waves) propagate through this structure— or not—depending on their wavelength. Wavelengths of light that are allowed to travel are known as modes, and groups of allowed modes form bands. Disallowed bands of wavelengths are called photonic band gaps. This gives rise to distinct optical phenomena such as inhibition of spontaneous emission, high-reflecting omni-directional mirrors and low-loss-waveguiding, amongst others. The magnetic nanoparticles 120 present in a colloidal state may have an attractive interaction therebetween in the curable material 110 due to the magnetism when a magnetic field is applied outside, and also have a repulsive interaction caused by an electrostatic force and a solvation force. By the balance between the attraction and the repulsion, the magnetic nanoparticles 120 are aligned at regular intervals, thereby forming a chain structure. Therefore, a inter-particle distance d between the aligned magnetic nanoparticles 120 may be determined by the magnetic field strength. As the magnetic field is stronger, the inter-particle distance d between the magnetic nanoparticles 120 aligned along the direction of the magnetic field may be reduced. The inter-particle distance d may be several to several hundreds of nanometers with the magnetic field strength. With a lattice spacing in the photonic crystal is changed, the wavelength of reflected light may be changed according to Bragg's law. As the magnetic field strength is increased, a structural color of a shorter wavelength region may be generated. As a result, a wavelength of the reflected light may be determined by the strength of a specific magnetic field. Unlike the conventional photonic crystal reflected only at a certain wavelength, the photonic crystal may exhibit an optical response that is fast, extensive and reversible with respect to an external magnetic field. As the lattice spacing is changed with the variation in the nearby magnetic field, the reflective light with a specific wavelength may be induced from external incident light.

According to an exemplary embodiment, a method of manufacturing a color encoded magnetic structure using OFML is provided. The method may include: filling a microfluidic channel with a composition including a curable material and magnetic nanoparticles dispersed in the curable material; applying a magnetic field to the composition in the microfluidic channel to form one-dimensional (1D) chain structures of the magnetic nanoparticles; and applying patterned UV rays to the composition to form a free-floating particle with fixed 1D chain structures.

The curable material may include a liquid-phase material such as a monomer, an oligomer or a polymer having a crosslinkable site. The free-floating particle may be encoded with a structural color generated from the 1D chain structures.

The method of manufacturing a color encoded magnetic structure may further include changing the magnetic field strength and sequentially solidifying more than one region of the composition to implement multilevel coding. The composition flowing through the microfluidic channel may be encoded with multicolored patterns by changing mask patterns and sequentially irradiating the patterned UV rays to the composition.

The free-floating particles showing structural colors may include a plurality of color codes, respectively. The plurality of color codes may have various colors determined by the magnetic field strength at the time of curing. A shape and colored pattern of the free-floating particle may be fixed by irradiation of the patterned UV rays.

Figure 3:
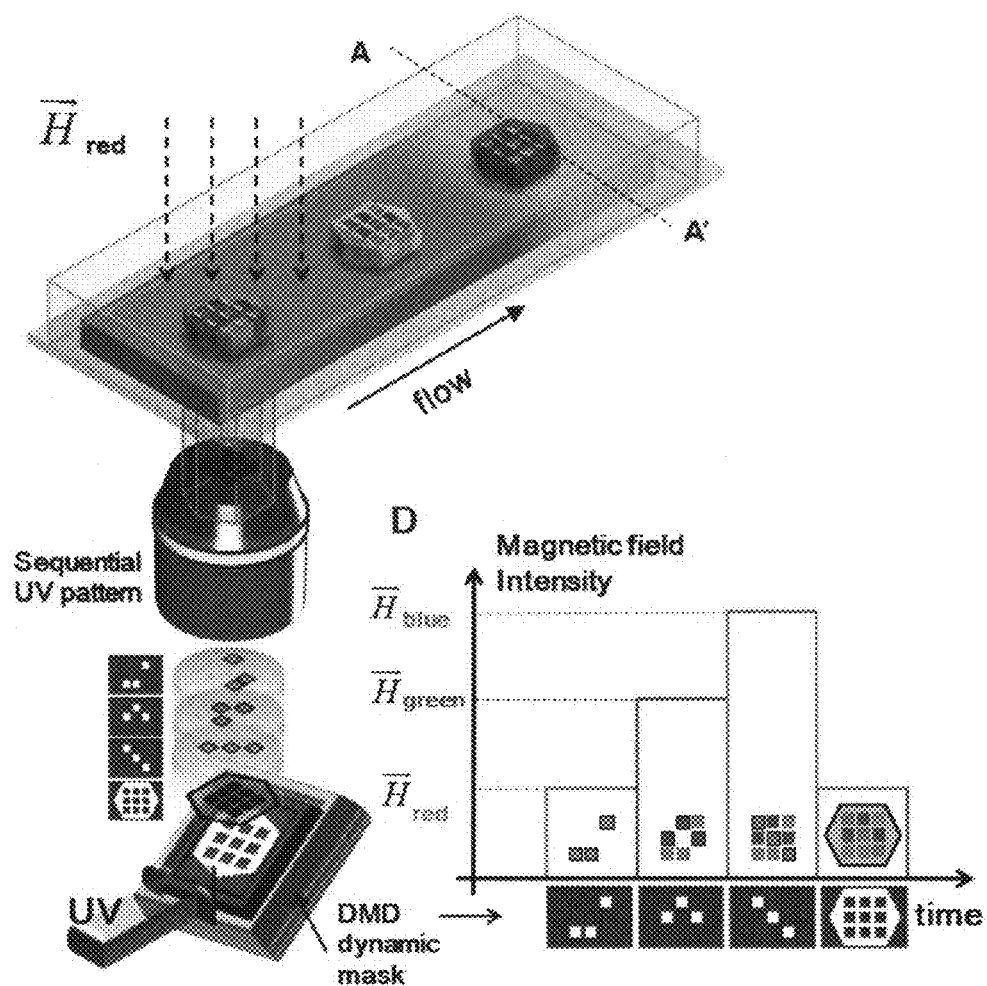
FIG. 3 is a schematic diagram showing a procedure of generating multicolor encoded microparticles.
Figure 4:
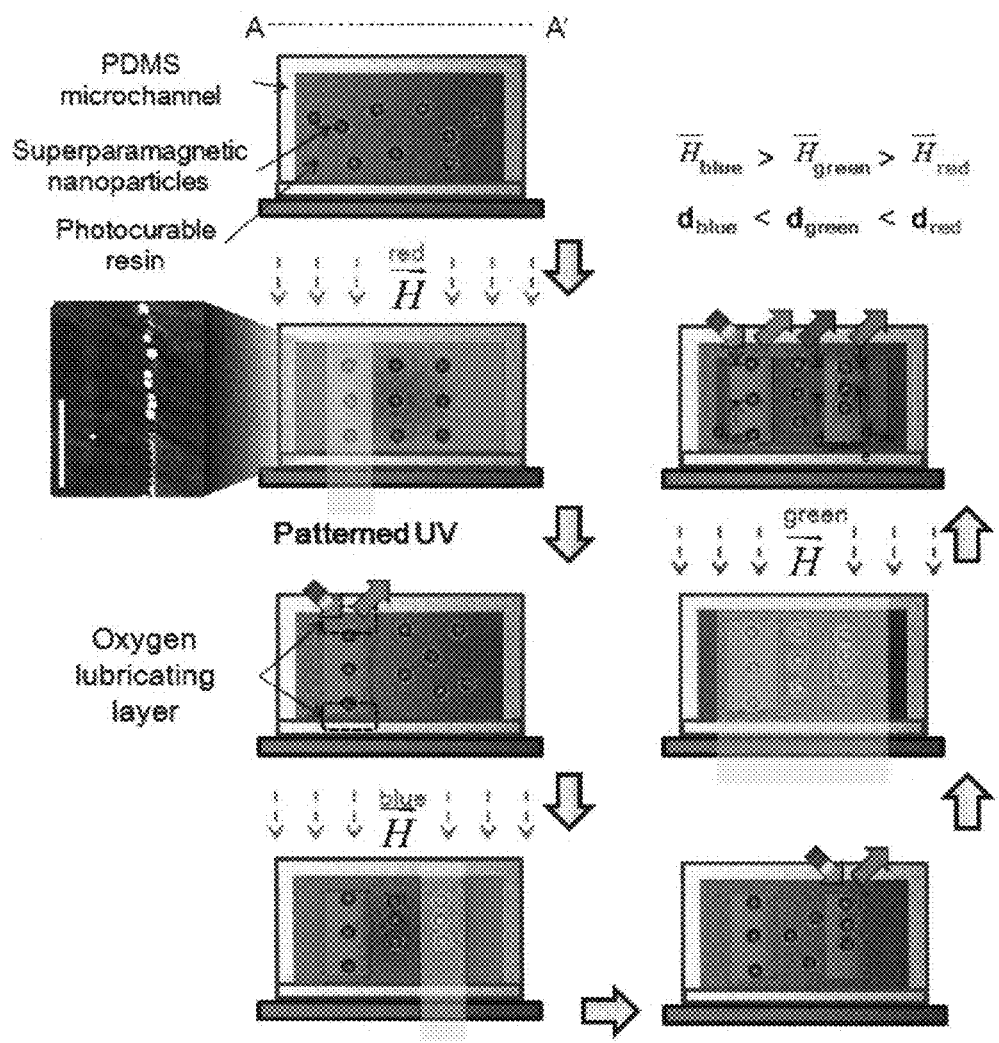
FIG. 4 is a schematic diagram viewed from a cross-sectional view taken along line A-A' of FIG. 3.

FIG. 3 is a schematic diagram showing a procedure of generating multicolor encoded microparticles. In addition, FIG. 4 is a schematic diagram viewed from a cross-sectional view taken along line A-A' of FIG. 3. Referring to FIGS. 3 and 4, a sequential process including cooperation of magnetic field modulation and spatially controlled UV exposure is used. First, a polydimethylsiloxane (PDMS) micro fluidic channel is filled with a composition including a photocurable resin and superparamagnetic nanoparticles dispersed in the photocurable resin.

Subsequently, a color of the composition is tuned by modulating an external magnetic field. A periodicity of the 1D chain structure of the superparamagnetic nanoparticles is changed with the magnetic field strength, and light of corresponding wavelength is reflected. In a scanning electron microscope (SEM) image of the second step of FIG. 4, the superparamagnetic nanoparticles are aligned in a chain structure to form a completely reversible 1D photonic crystal (scale bar: 1 µm). A stronger magnetic field results in a shorter inter-particle distance, which corresponds to a shorter diffracted wavelength. Once a structural color is determined by the external magnetic field, locally-patterned UV rays are irradiated to a specific region of the composition to fix the structural color. A DMD may be used as a dynamic mask to irradiate the patterned UV rays. The DMD may serve as a computer-controlled spatial light modulator. In FIG. 3, the UV rays are reflected from the DMD and therefore patterned UV rays are created. After the irradiation of the patterned LTV rays, the specific region is encoded with a specific color to generate an encoded bit.

Next encoded bits may be continuously created by sequentially changing the magnetic field strength and the pattern of the DMD. Since color tuning and fixing process for each bit takes approximately several tens of a second, overall process can be swiftly performed. In addition, realignment procedure required for the process using general masks is not needed, and thus the process is simple and less expensive. Moreover, an oxygen lubricant layer in the PDMS channel allows microparticles created by radical photopolymerization to move along the flow of a fluid without attachment to the PDMS channel wall.

By using such a characteristic, encoded particles having various colors and shapes may be created under various levels of the magnetic field, together with the patterned UV, using OFML. That is, free-floating particles may be formed by injecting a liquid phase curable resin containing a photonic crystal of magnetic nanoparticles into a microfluidic channel, and performing in-situ photopolymerization induced by patterned UV rays under various magnetic fields. The free-floating particles may be designed in desired shapes. For example, the free-floating particles of rod-type or disc-type (e.g. circle, square, hexagon, octagon and so on) may be produced under various UV patterns. Different kinds of encoded particles having small color dots may be formed by sequential UV exposure under various magnetic fields. In this case, possible expressions of graphical codes are not limited due to the flexibility of controlling of colors and shapes.

According to one exemplary embodiment, a color encoded magnetic structure including a solid medium and a code region is provided. The solid medium may be a cured polymer. The code region may be present in the solid medium. The code region may include magnetic nanoparticles aligned in a chain structure. The magnetic nanoparticles may include a superparamagnetic material. By the method described above with respect to the above exemplary embodiments, structural colors of the code region may be determined by inter-particle distance between the aligned magnetic nanoparticles.

When the magnetic nanoparticles are aligned in various ways, chain structures with various structural colors may be formed. Therefore, it is possible to implement multilevel coding using only one kind of magnetic nanoparticles. For example, multilevel codes more than binary codes composed only of black and white colors may be easily realized. For example, quaternary, octal or hexadecimal codes composed of 4, 8 or 16 colors may be realized.

The code region may include various color code information such as shapes or positions of color bits besides colors. For example, the shapes can be dots, lines or any arbitrary shapes.

Figure 5:
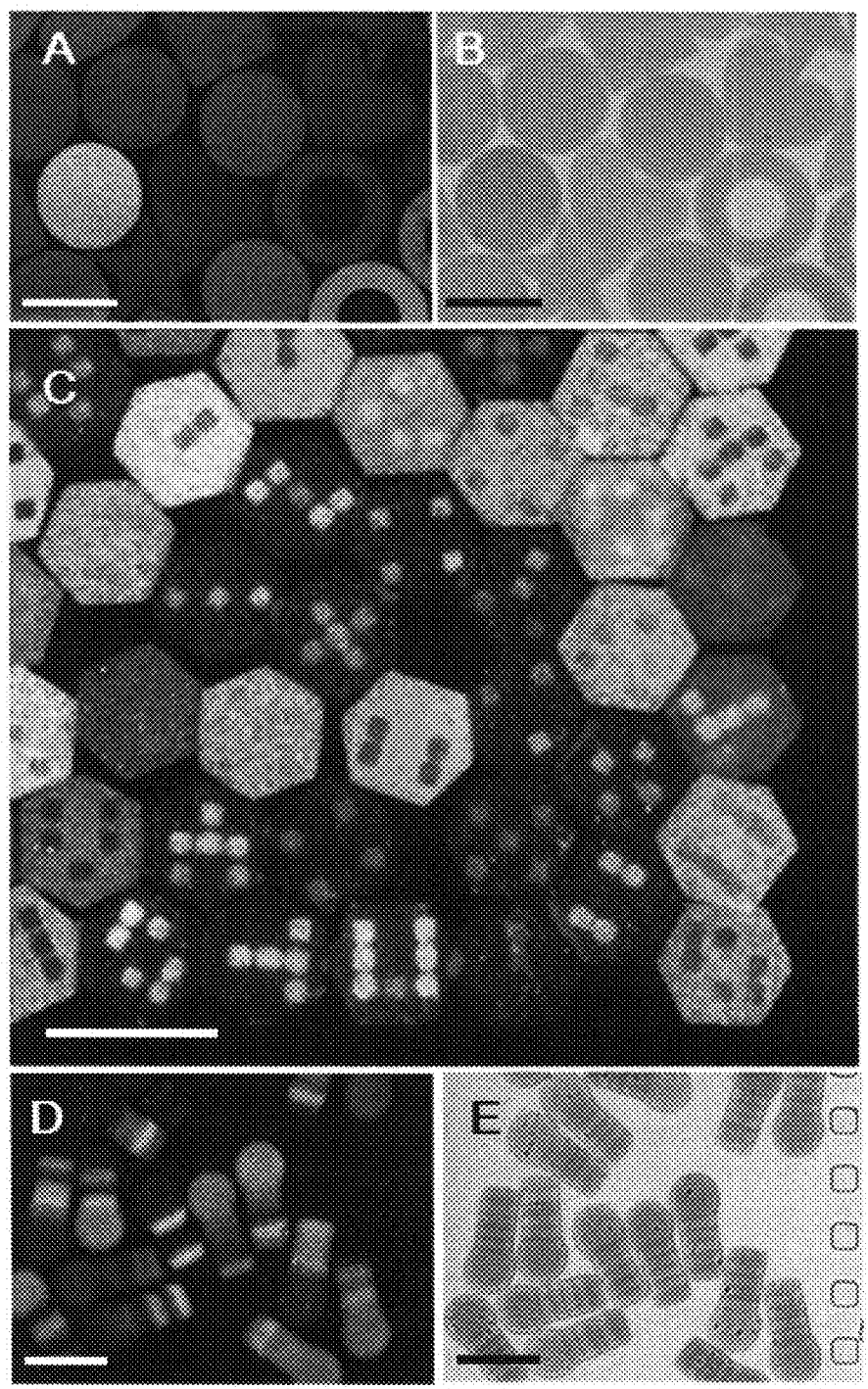
FIG. 5 shows images of various types of color encoded microparticles.

The magnetic structure, for example, may be in the form of a microparticle having a size of several tens to hundreds of micrometers. FIG. 5 shows images of various types of color encoded microparticles. Scale bars are 200 µm for A and B, 500 µm for C and 250 µm for D and E, respectively. As shown in A, C and D of FIG. 5, microparticles with various shapes and colors may be formed. In FIG. 5, B and E are transmission electron microscope (TEM) images of samples corresponding to A and D, respectively. Unlike A and D having colorful reflective images, B and E have brownish transmission images, which indicates that the color of the microparticles is caused by a structure of the superparamagnetic nanomaterial, not by coloring.

According to the color encoding by the above-mentioned method, several colors are disposed in local spaces separate from each other, respectively. In addition, a spectrum of the structural color in the local space has a single peak value. Thus, for example, position and color data of each code can be simultaneously obtained from position data and RGB data of a pixel only using a cheap charge coupled device (CCD) camera.

Figure 6:
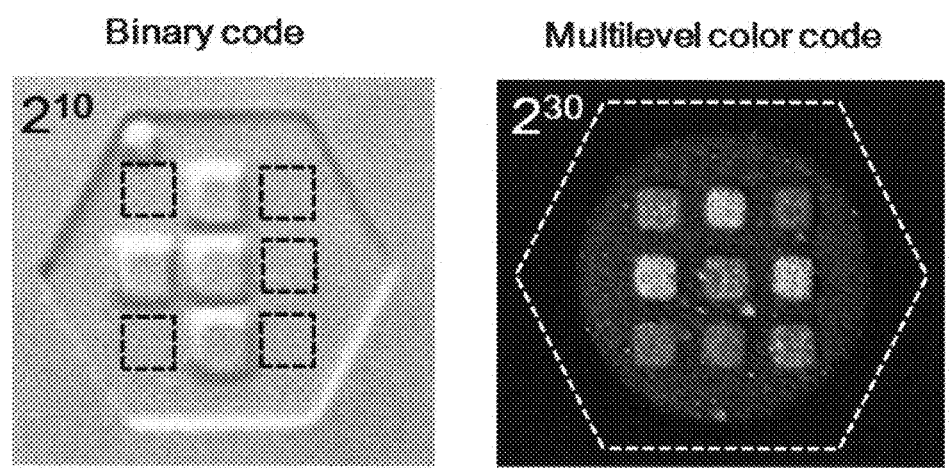
FIG. 6 shows images comparing a conventional binary encoded particle with a color encoded particle.

FIG. 6 shows images comparing a conventional binary encoded particle with a color encoded particle. Binary encoding was performed by concavo-convex patterning in 10 regions in a particle. Color encoding in a particle was performed by using 8 easily distinguishable colors to implement multilevel coding. Referring to FIG. 6, in the left image showing binary encoding, only $2^{10}$ ($\approx 10^3$) codes can be created with 10 distinct bits. However, in the right image showing color encoding, $8^{10}$ ($= 2^{30} \approx 10^9$) easily readable color codes can be created using a 10 bit system. This huge coding capacity of the color encoded particles enables the encoding of much larger molecular libraries with smaller particle sizes.

For multiplexed biomolecule assay, the color encoded magnetic structure may further include a probe region. The probe region may include a binding site capable of binding an external target. The external target is not particularly limited, but may include DNA, protein, or a biochemical material.

According to an exemplary embodiment, a method of analyzing a color code, which includes: providing a magnetic structure including a probe region and a code region encoded with a color code; binding a target with the probe region; and decoding information from the magnetic structure with the target, wherein the code region includes a photonic crystal of magnetic nanoparticles. The photonic crystal includes aligned magnetic nanoparticles, and structural colors may be determined by inter-particle distance between the aligned magnetic nanoparticles. In addition, the information may include a shape, a position and a color of the color code, independently or in combination. The code region may include at least one color code information selected from the group consisting of a shape, a position and a color of the color code.

FIGS. 7 to 10 show examples of a multiplexed biomolecule assay using a color encoded magnetic structure to detect and identify DNA hybridization. All scale bars are 100 µm. The color encoded magnetic structure may have a smaller particle size than a typical probe spot of a DNA microarray, and thus an encoding capacity may be more than several billions of kinds of possibilities.

Figure 7:
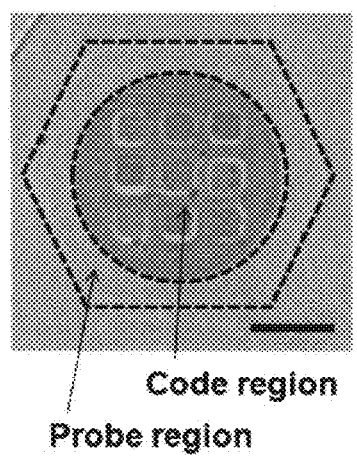
FIG. 7 is a microscope image of a color encoded magnetic structure.

FIG. 7 is a microscope image of a color encoded magnetic structure. As shown in FIG. 7, a color encoded particle may include a code region and an oligonucleotide probe region. To avoid spectral overlapping of a fluorescent signal for detection of hybridization with a structural color signal for color encoding, the oligonucleotide probe region was spatially separated from the code region. The code region was synthesized from a composition for forming a color encoded magnetic structure, and the probe region was formed from a mixture of PEG-DA and a buffer solution of an acrylate-modified DNA oligomer probe.

Figure 8:
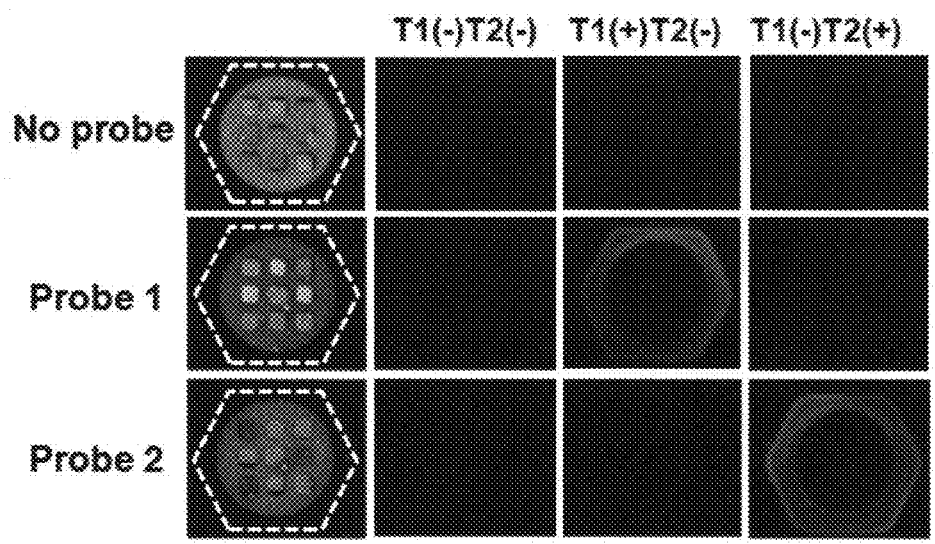
FIG. 8 shows reflective microscope images of multiplexed assays based on hybridization of three kinds of encoded particles and DNA oligomer targets.

FIG. 8 is reflective microscope images of multiplexed assays based on hybridization of three kinds of encoded particles and DNA oligomer targets. As shown in FIG. 8, 12.5 µM of DNA probes with different nucleotides sequences (probe 1: 5'-ACA CTC TAC AAC TTC-3', probe 2: 5'-ATC AGA TTG GTT AGT-3' and Control: a sample without a DNA probe) were incorporated into different color coded microparticles. 1 µM of DNA oligomer targets labeled with a fluorescent material were then introduced and incubated for 10 minutes. T1 and T2 are targets complementary to probe 1 and probe 2, respectively, a mark (+) indicates the presence of the target, and a mark (−) indicates the absence of the target. As a result, only the particles with DNA probes complementary to the DNA oligomer targets show fluorescence.

Figure 9:
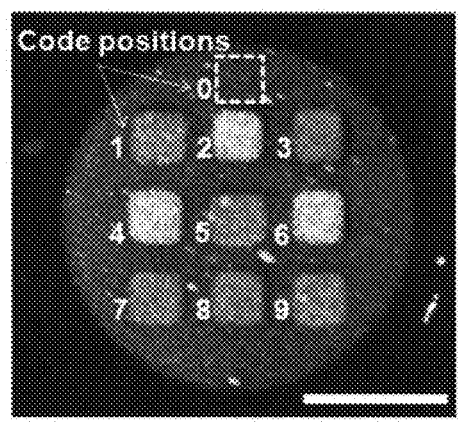
FIG. 9 shows results obtained after an encoded particle having a probe 1 is hybridized with a complementary oligomer target (T1)

The decoding process is simple and compatible with ordinary microscopes and color image analyzers. Decoding of a single encoded particle for target molecule identification is shown in FIGS. 9 and 10. FIG. 9 shows a result obtained after an encoded particle having probe 1 is hybridized with a complementary oligomer target (T1). FIG. 10 shows a result obtained after the encoded particle of FIG. 9 is decoded. RGB levels of individual code positions were obtained from reflective micrograph readings using a full color CCD. The resulting RGB values were digitized to specific code levels. Referring to FIG. 10, the respective RGB values were divided into 4 levels, resulting in four possibilities for each R, G and B value. The capability for multiplexing is virtually limitless. Here, for example, encoding and decoding of a microparticle with square-shaped color bits with 10 code positions and 4 color variations was chosed.

According to the method of manufacturing a color encoded magnetic structure described above, the encoding capacity can be increased into the billions using brilliant, easily distinguishable color encoding. In addition, the use of color tunable magnetic structure also enables cost-effective and scalable manufacturing of the color encoded microparticles by eliminating need of multiple coloring materials. Moreover, colors are magnetically tunable and lithographically fixable, and therefore high-definition patterning can be performed. Various applications can be developed by the above method. The above-mentioned color encoded magnetic structure can be useful in reflective displays, practical multiple bioassay and anti-counterfeiting of small objects.

The foregoing is illustrative of the present disclosure and is not to be construed as limiting thereof. Although numerous embodiments of the present disclosure have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A method of analyzing a color code, comprising:
providing a magnetic structure including a probe region and a code region encoded with a plurality of color codes which are fixed and have various colors the magnetic structure generated by sequentially irradiating patterned ultraviolet rays while i) varying a magnetic field strength applied to the code region and ii) changing mask patterns so that different regions of the code region are sequentially solidified with different colors and different shapes;
binding a target with the probe region; and
decoding information from the magnetic structure with the target, wherein the code region includes a photonic crystal of fixed magnetic particles.

2. The method according to claim 1, wherein the fixed magnetic nanoparticles are aligned, and structural colors of the code region are determined by inter-particle distance between the fixed magnetic nanoparticles which are aligned.

3. The method according to claim 1, wherein the information includes at least one selected from the group consisting of a shape, a position and a color of the color code.

4. The method of claim 1, wherein the code region is synthesized from a composition including a curable material in which a plurality of magnetic nanoparticles are dispersed, wherein the composition is solidified so that the plurality of magnetic nanoparticles are dispersed, wherein the composition is solidified so that the plurality of magnetic nanoparticles are fixed in the code region.

5. The method according to claim 1, wherein the decoding is performed by using a microscope and an image analyzer.

6. The method according to claim 5, wherein the decoding comprises obtaining RGB values of the individual color codes from micrograph readings.

7. The method according to claim 6, wherein the decoding further comprises digitizing the RGB values to specific code levels.

* * * * *